United States Patent [19]

Burk et al.

[11] Patent Number: 4,591,202
[45] Date of Patent: May 27, 1986

[54] FRONT ASSEMBLY FOR MOTOR VEHICLES

[75] Inventors: Gerhard Burk, Sindelfingen; Manfred Mordau, Wildberg, both of Fed. Rep. of Germany

[73] Assignee: Daimler-Benz Aktiengesellschaft, Fed. Rep. of Germany

[21] Appl. No.: 690,537

[22] Filed: Jan. 11, 1985

[30] Foreign Application Priority Data

Jan. 27, 1984 [DE] Fed. Rep. of Germany ....... 3402744

[51] Int. Cl.[4] ............................................ B62D 25/08
[52] U.S. Cl. .................................. 296/194; 296/192; 296/208
[58] Field of Search .............. 296/194, 192, 193, 196, 296/197, 208

[56] References Cited

U.S. PATENT DOCUMENTS

| | | | |
|---|---|---|---|
| 2,654,634 | 10/1953 | Zummach | 296/194 |
| 2,994,280 | 8/1961 | Barenyi | 296/208 |
| 3,188,132 | 6/1965 | Schwiering | 296/194 |
| 3,596,978 | 8/1971 | Wessells | 296/194 |
| 4,391,465 | 7/1983 | Piano | 296/208 |
| 4,449,749 | 5/1984 | Eger | 296/194 |
| 4,466,653 | 8/1984 | Harasaki | 296/194 |

*Primary Examiner*—Robert R. Song
*Attorney, Agent, or Firm*—Craig and Burns

[57] ABSTRACT

A front assembly for motor vehicles, with a cross-member extending underneath a windshield and with an end wall which adjoins the cross-member at the bottom and in front of which is located, on the same side as the engine space, an equipment space which is divided into a central space and lateral spaces adjacent to the control space, each on the right and left respectively and which is partitioned off from the engine space by partition walls, the end wall possessing, in the region of the central part space, a passage orifice for air conveyed by a blower of a heating and or airconditioning system of the vehicle. To make it possible to ensure optimum cable connection between the right and left part spaces, at least in the upper part of the central part space, there are two partition walls arranged one behind one another in the longitudinal direction of the vehicle, these partition walls enclosing a channel open at the top, which serves for the laying of electrical lines or the like and which is sealed off tightly by means of the closed engine hood.

4 Claims, 3 Drawing Figures

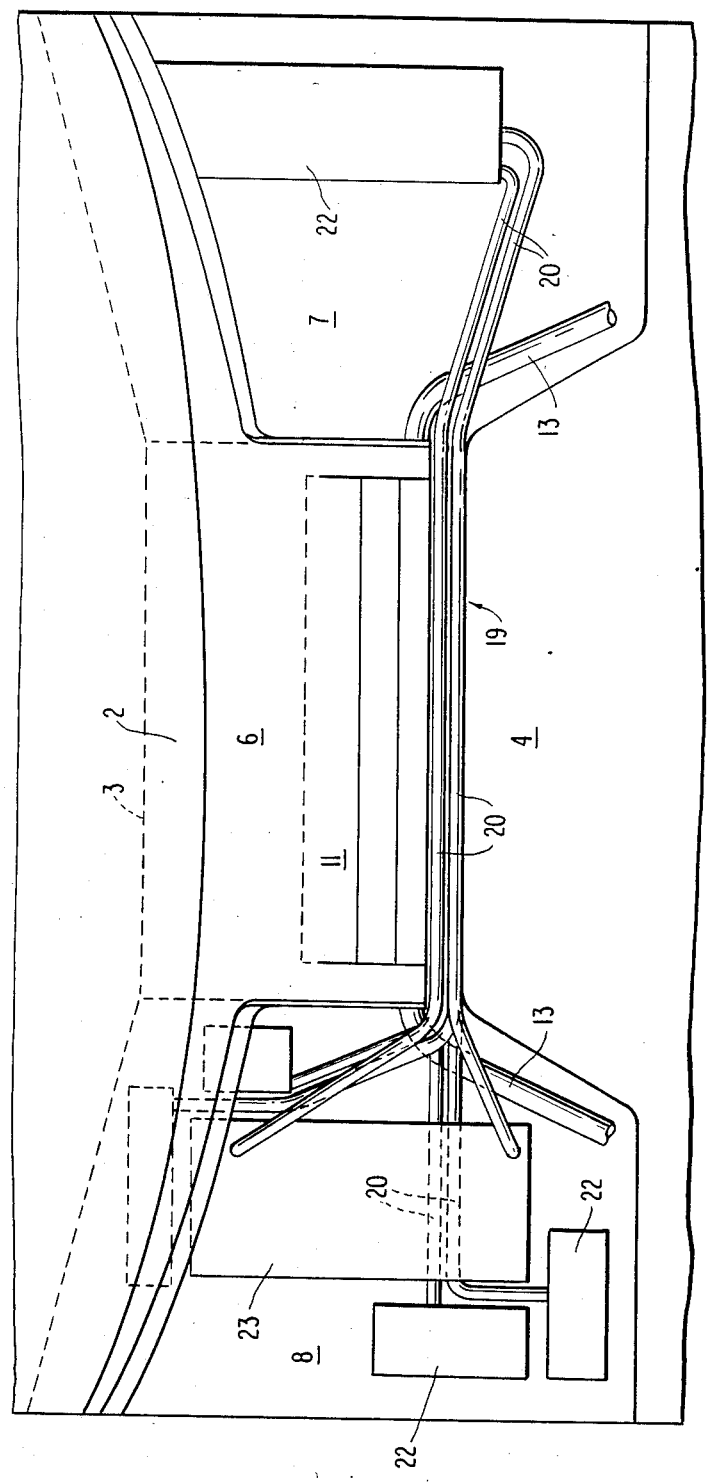

FRONT ASSEMBLY FOR MOTOR VEHICLES

The invention relates to a front assembly for motor vehicles, with a cross-member extending underneath a windshield and with an end wall which adjoins the cross-member at the bottom and in front of which is located, on the same side as the engine space, an equipment space which is divided into a central space and lateral spaces adjacent to the central space each on the right and left respectively and the equipment space being partitioned off from the engine space by partition walls, the end wall possessing, in the region of the central space, a passage orifice for air conveyed by a blower of a heating and/or air conditioning system of the vehicle.

In equipment spaces designed in this way, a water box is often provided in the central space, since air mixed with water is sucked into the space by the blower of the heating system. In contrast to this, the lateral spaces located on both sides of the central space are protected against the penetration of moisture, since electronic control devices and the like are often accommodated there. However, this means that numerous cable connections have to be made between the items of equipment located in the right and left lateral spaces, and these cable connections pass through the central space, so that its long longitudinal bulkhead walls are weakened because of the perforations for the lines, and undesirable heat and sound transmissions occur.

Such orifices and perforations should, however, be avoided precisely because this central equipment space, with the large end-wall orifice located behind it and intended for the blower, is a very critical points as regards the passage of heat and sound to the vehicle interior.

The object of the present invention is, therefore, to provide a solution which could be put into effect by simple means.

This object is achieved, according to the invention, when, at least in the upper part of the central part space, there are on the same side as the engine space two partition walls arranged behind one another in the longitudinal direction of the vehicle, and when these partition walls enclose a channel open at the top, which serves for the laying of communication lines such as electrical lines or the like and which is sealed off tightly by means of the closed engine bonnet.

The foregoing and other objects, features, and advantages of the present invention will become more apparent from the following description when taken in connection with the accompanying drawings which show, for the purpose of illustrations only, one embodiment in accordance with the present invention, and wherein:

FIG. 2 shows a plan view of the illustration according to FIG. 1, and

Figure 3:
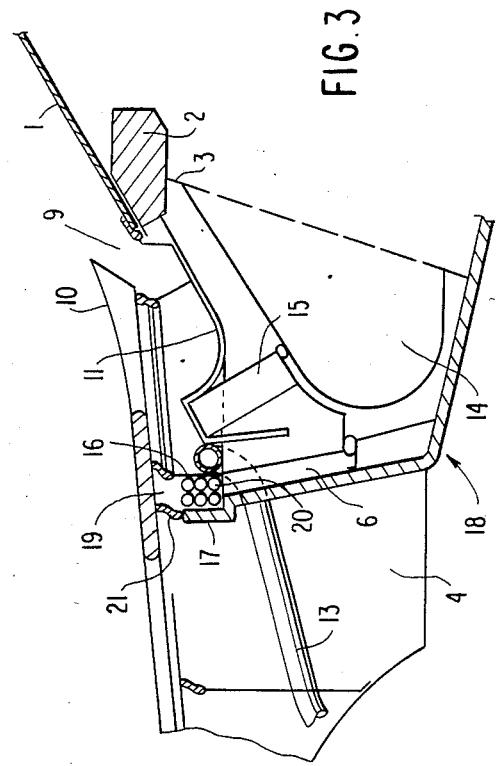
FIG. 3 shows a section along the line III—III in FIG. 1.

Turning now to a consideration of the drawings wherein like reference numerals designate like elements, and in particular to FIG. 3, the front attachment region, shown as an exemplary embodiment of the invention, of a motor vehicle, especially a passenger car or an estate car, has, underneath a windshield 1, a cross-member 2 which an end wall 3 adjoins at the bottom. The end wall 3 has located in front of it, towards the engine space 4, an equipment space 5 is shown in FIG. 2, which is divided into a central space 6 and two lateral spaces 7 and 8.

A water box 11 is inserted into the central space 6 which communicates with the free outside air via a gap 9 between the rear end of an engine hood 10 and the windshield 1, and a water discharge line 13 leading to a wheel mounting 12 extends from each of the two sides of this water box 11. A filter 15 is located in the path of the air entering through the gap 9 upstream of the blower 14.

The central space 6 is partitioned off from the engine space 4 in its upper region by two partition walls arranged in a distance from one another. Specifically, a first partition wall 16 is formed by a vertical wall region of the water box 11, and a second partition wall 17 is formed by a sound-proof housing 18 surrounding the entire central space 6. The partition walls 16 and 17 form, in their upper region, the lateral limits for a channel 19 open at the top, into which are laid electrical lines 20 which, for example, connect the lateral or other spaces 7 and 8 to one another. When the engine hood is closed, the channel 19 is covered at the top, elastic gaskets 21 also being interposed. The bottom of the channel 19 can be formed in any way. In the exemplary embodiment illustrated, a sheet-metal flange of the water box 11 serves as the bottom of the channel 19.

Figure 1:
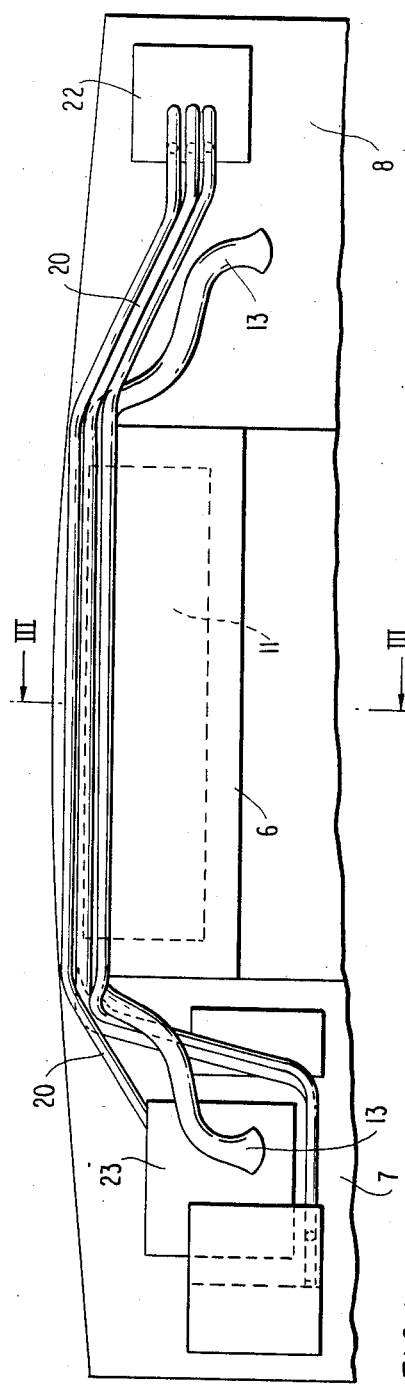
FIG. 1 shows a front view of the equipment space region of a motor vehicle.

In FIGS. 1 and 2 of the drawing, control devices or the like installed in the part spaces 7 and 8 are designated by 22 and the battery of the vehicle is designated by 23.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A front assembly for motor vehicles, having a cross-member extending underneath a windshield and with an end wall which adjoins the cross-member at the bottom and in front of which is located, on the same side as an engine space, an equipment space which is divided into a central space and lateral spaces adjacent to the central space, each on the right and left respectively, the equipment space being partitioned off from the engine space, the end wall possessing, in the region of the central space, a passage orifice for air conveyed by a blower of a heating and/or air-conditioning system of the vehicle, and comprising channel means comprising
a first partition wall disposed in the upper part of the central space contiguous to said engine space,
a second partition wall disposed behind said first partition wall in the longitudinal direction of the vehicle to define a channel enclosed by said first and second partition walls for receiving communication lines, the channel having an opening at the top and
engine hood means for sealing said opening.

2. A front assembly according to claim 1, further comprising
a third partition wall disposed behind said second partition wall in the longitudinal direction of the vehicle to define a water box between said second and third partition walls.

3. A front assembly according to claim 1, wherein at least one of said first, second and third partition walls facing the engine space is sound-proofed.

4. A front assembly according to claim 2, further comprising
at least one water line for discharging water from the water box into the region of a wheel mounting.

* * * * *